US010312851B2

(12) United States Patent
Yoshida

(10) Patent No.: US 10,312,851 B2
(45) Date of Patent: Jun. 4, 2019

(54) MOTOR DRIVE HAVING FUNCTION FOR PREVENTING SECONDARY DAMAGE

(71) Applicant: FANUC CORPORATION, Yamanashi (JP)

(72) Inventor: Tomokazu Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/942,033

(22) Filed: Nov. 16, 2015

(65) Prior Publication Data

US 2016/0149531 A1 May 26, 2016

(30) Foreign Application Priority Data

Nov. 20, 2014 (JP) ................................ 2014-235824

(51) Int. Cl.
*H02H 7/08* (2006.01)
*H02P 29/024* (2016.01)
*H02H 11/00* (2006.01)

(52) U.S. Cl.
CPC ....... *H02P 29/0241* (2016.02); *H02H 11/005* (2013.01); *H02H 11/006* (2013.01); *H02H 7/08* (2013.01)

(58) Field of Classification Search
CPC ...... B62D 5/0487; H02M 1/32; H02K 41/031
See application file for complete search history.

(56) References Cited

U.S. PATENT DOCUMENTS

2008/0303471 A1* 12/2008 Fujishiro .............. H02K 21/029 318/563
2009/0185197 A1* 7/2009 Wilson .................... H02P 29/02 358/1.1

(Continued)

FOREIGN PATENT DOCUMENTS

CN 102201780 A 9/2011
JP 5316750 A 11/1993

(Continued)

OTHER PUBLICATIONS

English Abstract and Machine Translation for Japanese Publication No. JPH0946891 A, published Feb. 14, 1997, 17 pgs.

(Continued)

*Primary Examiner* — Muhammad S Islam
(74) *Attorney, Agent, or Firm* — Fredrikson & Byron, P.A.

(57) ABSTRACT

A motor drive includes a condition detection circuit for monitoring the condition of the drive, an determination circuit for determining whether detected data indicates an abnormality, a memory unit for storing a detection value including at least one of a peak voltage applied to the drive, a peak current flowing through the drive, the cumulative number of occurrences of abnormalities, and variations in the peak voltage or current with time, when the abnormality occurs, and a setting unit for setting in advance set values including an allowable peak voltage and current and the allowable number of occurrences of abnormalities, and allowable variations in the peak voltage and current with time allowable by the drive. Whenever the motor drive is powered on, it is determined whether the detection value reaches the set value. When the detection value reaches the set value, the power-on of the motor drive is prohibited.

2 Claims, 6 Drawing Sheets

(56) References Cited

U.S. PATENT DOCUMENTS

2011/0238338 A1* 9/2011 Iwashita ............... H02P 29/025 702/58
2012/0217920 A1* 8/2012 Singh ................... G01R 31/343 318/490
2014/0136130 A1* 5/2014 Nelson .................... G06F 17/00 702/58

FOREIGN PATENT DOCUMENTS

JP 7308074 A 11/1995
JP 0946891 A 2/1997

OTHER PUBLICATIONS

English Abstract for Japanese Publication No. 07-308074 A, published Nov. 21, 1995, 1 pg.
English Abstract for Japanese Publication No. 05-316750 A, published Nov. 26, 1993, 1 pg.
English Abstract and Machine Translation for Japanese Publication No. 05-316750 A, published Nov. 26, 1993, 7 pgs.
English Abstract and Machine Translation for Chinese Publication No. 102201780 A, published Sep. 28, 2011, 5 pgs.

* cited by examiner

1003
INVERTER MAIN CIRCUIT
1010
FUSE BLOWOUT CIRCUIT
1011
1007
ALARM EVALUATION CIRCUIT
COMMAND TO TURN ON MCC
1012
1004
1005
1002
CONVERTER MAIN CIRCUIT
OVERCURRENT DETECTION CIRCUIT
ALARM LATCH CIRCUIT
ALARM RESET CIRCUIT
1006
1001
MAIN CIRCUIT MCC
MCC DRIVE CIRCUIT
1008
1009
MCC DRIVE COIL
POWER SOURCE
1020
PRIOR ART

1003
INVERTER MAIN CIRCUIT
1012
1002
CONVERTER MAIN CIRCUIT
1004
OVERCURRENT DETECTION CIRCUIT
ONCE OVERCURRENT IS DETECTED, FUSE IS MELTED TO DISABLE MCC
1010
FUSE BLOWOUT CIRCUIT
1011
1005
ALARM LATCH CIRCUIT
1007
ALARM EVALUATION CIRCUIT
COMMAND TO TURN ON MCC
1006
ALARM RESET CIRCUIT
1001
MAIN CIRCUIT MCC
1008
MCC DRIVE CIRCUIT
1009
MCC DRIVE COIL
POWER SOURCE
1020
PRIOR ART

101
MOTOR DRIVE
DC LINK CAPACITOR
4
INPUT OF EXTERNAL SIGNAL
3
CONVERTER MAIN CIRCUIT
31
POWER ELEMENT
6
DETERMINATION CIRCUIT
CONDITION DETECTION CIRCUIT
5
STORE DATA AT THE TIME OF OCCURRENCE OF ABNORMALITY
SETTING UNIT
7
COMPARISON
MEMORY UNIT
8
MCC DRIVE CIRCUIT
9
2
MAIN CIRCUIT MCC
MAIN BREAKER
1
10
MCC DRIVE COIL
POWER SOURCE
20

START
S201
PEAK VOLTAGE OR PEAK CURRENT ≥SET VALUE?
Y
N
S202
CUMULATIVE NUMBER OF OCCURRENCES OF ABNORMALITIES ≥SET VALUE?
Y
N
S203
VARIATIONS IN PEAK VOLTAGE OR PEAK CURRENT WITH TIME ≥SET VALUE?
Y
N
S204
ASSUME THAT MOTOR DRIVE HAS BECOME DAMAGED AT THE TIME OF OCCURRENCE OF PREVIOUS ABNORMALITY, AND PROHIBIT REPOWERING OF MAIN CIRCUIT MCC
S205
REPOWER MAIN CIRCUIT MCC
END

MOTOR DRIVE HAVING FUNCTION FOR PREVENTING SECONDARY DAMAGE

BACKGROUND OF THE INVENTION

1. Field of the Invention

The present invention relates to a motor drive, and more specifically relates to a motor drive having a function for preventing damage from spreading, even if power is supplied again to the motor drive that has been damaged by an abnormality.

2. Description of Related Art

As a conventional art, there are known motor drives that, in the event of an overcurrent condition of a power element inside the motor drives, store the presence or absence of an alarm and disable the next and later power-on to avoid secondary damage to the motor drives.

For example, there are known motor drives having a secondary damage prevention circuit for a main circuit of the motor drive. The secondary damage prevention circuit is provided with a means for detecting an overcurrent through the main circuit of the motor drive. Upon detecting the overcurrent flowing through the main circuit, the secondary damage prevention circuit issues an overcurrent alarm, as well as storing the issue of the alarm, and disables the next and later power-on (for example, Japanese Patent Application Laid-Open No. 9-46891).

FIG. 1 is a block diagram of a conventional motor drive. In the conventional motor drive shown in FIG. 1, an overcurrent protection circuit for a converter main circuit 1002 includes an overcurrent detection circuit 1004, an alarm latch circuit 1005, an alarm reset circuit 1006, an alarm evaluation circuit 1007, an MCC drive circuit 1008, an MCC drive coil 1009, and a fuse blowout circuit 1010.

A control circuit (main circuit MCC) 1001 controls an alternating current power supply from a power source 1020 to the converter main circuit 1002. The alternating current power supplied to the converter main circuit 1002 is converted into direct current power, smoothed by a DC link capacitor 1012, and then inputted to an inverter main circuit 1003 for driving a motor (not shown). The overcurrent detection circuit 1004 has a first detection level to detect an overcurrent passing through the control circuit 1001 and a second detection level below the first detection level. The first memory means (fuse blowout circuit) 1010 stores a detection value using the first detection level. The second memory means (alarm latch circuit) 1005 stores a detection value using the second detection level in a resettable manner. The secondary damage prevention circuit for the converter main circuit 1002 controls the control circuit 1001 based on the memory contents of the first memory means 1010 and second memory means 1005, so as to prevent the reclosing of the control circuit 1001 using alarm reset.

This conventional motor drive aims only at protecting the converter main circuit 1002 provided in the secondary damage prevention circuit, and does not protect component parts provided outside the secondary damage prevention circuit such as the main circuit MCC 1001. Also, in the conventional motor drive, an alarm is issued by focusing only on the overcurrent, as a factor for the secondary damage to the motor drive. Thus, there is a problem that the conventional motor drive does not provide protection against other types of abnormalities.

Furthermore, this conventional motor drive is too sensitive to the occurrence of abnormalities, because, as shown in FIG. 2, once the overcurrent detection circuit 1004 detects an abnormality, a fuse 1011 melts in the fuse blowout circuit 1010 to disable the next or later power-on of the power source 1020.

SUMMARY OF THE INVENTION

The conventional motor drive has a problem such that, although only a power element inside a converter main circuit is protected, the other component components are not protected. There is another problem that, although protection against an overcurrent condition is performed, protection against the other abnormalities is not provided. Moreover, there is another problem that the conventional motor drive sensitively responds to even a false detection of an abnormal condition, because once an alarm is issued, power-on is disabled thereafter.

A motor drive according to an embodiment of the present invention includes a condition detection circuit for monitoring the condition of the motor drive by detecting data representing the condition of the motor drive; an determination circuit for determining whether or not the detected data indicates an abnormality in the motor drive; a memory unit for storing a detection value including at least one of a peak voltage applied to the motor drive, a peak current flowing through the motor drive, the cumulative number of occurrences of abnormalities, variations in the peak voltage with time, and variations in the peak current with time, in the event of occurrence of the abnormality in the motor drive; and a setting unit for setting in advance set values including an allowable peak voltage, an allowable peak current, and the allowable number of occurrences of abnormalities, allowable variations in the peak voltage with time, and allowable variation in the peak current with time allowable by the motor drive. Whenever the motor drive is powered on, it is determined whether or not the detection value stored in the memory unit reaches the set value set in advance. In a case where the detection value reaches the set value, the power-on of the motor drive is prohibited to avoid secondary damage to the motor drive.

BRIEF DESCRIPTION OF THE DRAWINGS

Objects, characteristics and advantages of the present invention will become more apparent from the following description of embodiments of the present invention with reference to the accompanying drawings, in which.

DETAILED DESCRIPTION OF THE INVENTION

A motor drive according to the present invention will be described below with reference to the drawings. It is noted that the technical scope of the present invention is not limited to an embodiment thereof but covers the invention described in the claims and equivalents thereof.

Figure 1:
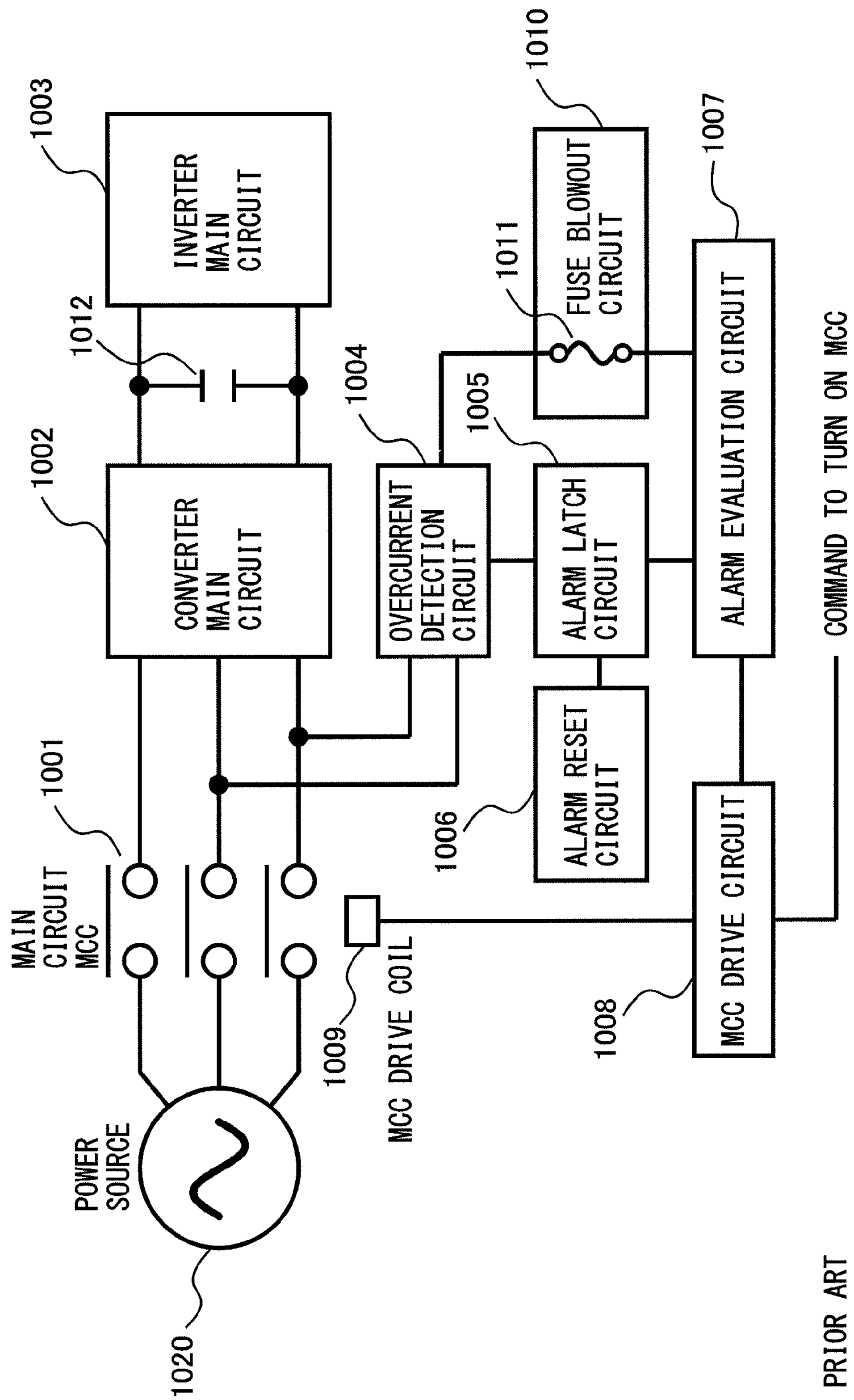
FIG. 1 is a block diagram of a conventional motor drive.
Figure 2:
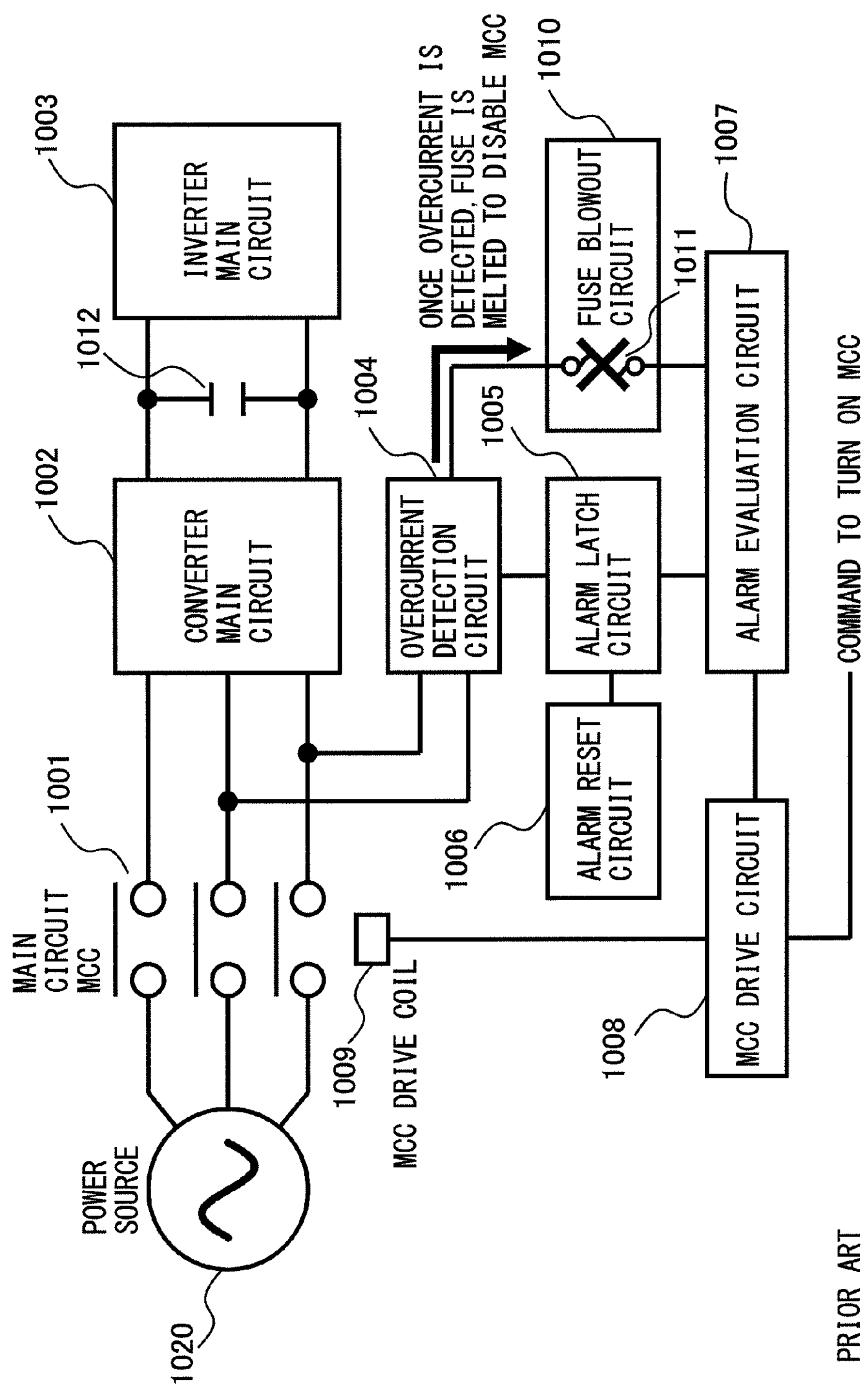
FIG. 2 is a block diagram of the conventional motor drive showing a path of an electric current for blowing a fuse.
Figure 3:
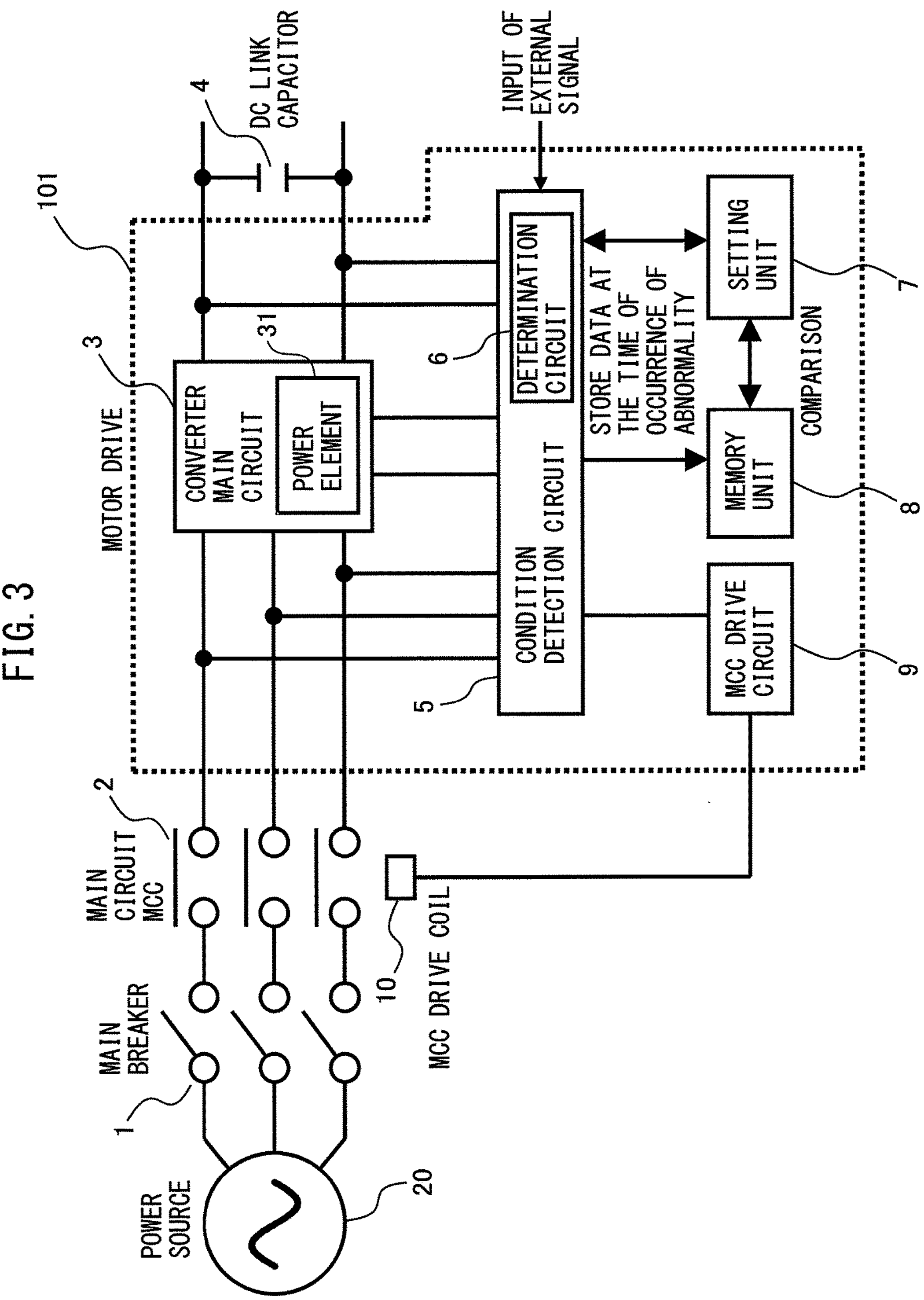
FIG. 3 is a block diagram of a motor drive according to an embodiment of the present invention.

FIG. 3 is the block diagram of the motor drive according to the embodiment of the present invention. A motor drive 101 according to the embodiment of the present invention includes a condition detection circuit 5, a determination circuit 6, a memory unit 8, and a setting unit 7. The condition detection circuit 5 monitors the condition of the motor drive 101 by detecting data representing the condition of the motor drive 101. The determination circuit 6 determines whether or not the detected data indicates an abnormality in the motor drive 101. In the event of occurrence of an abnormality in the motor drive 101, the memory unit 8 stores a detection value that includes at least one of a peak voltage applied to the motor drive 101, a peak current passed through the motor drive 101, the cumulative number of occurrences of abnormalities, variations in the peak voltage or peak current with time. The setting unit 7 sets in advance set values that include an allowable peak voltage, an allowable peak current, and the allowable cumulative number of occurrences of abnormalities and allowable variations in the peak voltage and peak current with time allowable by the motor drive 101. The motor drive 101 makes a determination as to whether or not the detection value stored in the memory unit 8 reaches the set value set in advance, whenever the motor drive 101 is powered on. In a case where the detection value reaches the set value, the power-on of a power source 20 is prohibited to prevent secondary damage to the motor drive 101.

Alternating current power from the power source 20 is fed to a converter main circuit 3 through a main circuit breaker 1 and a main circuit MCC (electromagnetic contactor) 2, and converted into direct current power. The converter main circuit 3 uses a power element 31 such as an IGBT. The converted direct current power is smoothed by a DC link capacitor 4, and fed to an inverter (not shown) for motor driving to be converted therein into alternating current power for motor driving.

The condition detection circuit 5 detects the condition of the motor drive 101 from a voltage applied from the power source 20 to the converter main circuit 3 and a current flowing from the power source 20 into the converter main circuit 3.

The determination circuit 6 checks whether or not the voltage applied from the power source 20 to the converter main circuit 3 is higher than a predetermined threshold voltage (first threshold voltage $V_{TH1}$), or whether or not the current flowing from the power source 20 to the converter main circuit 3 is larger than a predetermined threshold current (first threshold current $I_{TH1}$), to make a determination as to whether or not the motor drive 101 is in an abnormal condition.

When it is determined that an abnormality occurs in the motor drive 101, the determination circuit 6 sends the peak voltage and the peak current to the memory unit 8. The peak voltage is a maximum value of the voltage applied from the power source 20 to the converter main circuit 3 at the time of occurrence of the abnormality. The peak current is a maximum value of the current flowing from the power source 20 into the converter main circuit 3 at the time of occurrence of the abnormality.

The determination circuit 6 counts the number of occurrence of the abnormality, and sends to the memory unit 8 the cumulative number of occurrences of abnormalities, which is the number of occurrences of abnormalities in the past. Furthermore, the determination circuit 6 calculates the variations with time in the peak voltage and peak current detected by the condition detection circuit 5, and sends calculation results to the memory unit 8.

The memory unit 8 stores the detection value including at least one of the peak voltages applied to the converter main circuit 3, the peak current flowing through the converter main circuit 3, the cumulative number of occurrences of abnormalities, and the variations in the peak voltage or peak current with time.

The setting unit 7 sets set values (for example, a second threshold voltage $V_{TH2}$ and a second threshold current $I_{TH2}$) that are reference values to make a determination as to whether or not the data of the voltage, current, and the like detected by the condition detection circuit 5 is within an allowable range. To be more specific, the setting unit 7 sets in advance an allowable peak voltage, an allowable peak current, and the allowable cumulative number of occurrences of abnormalities, and allowable variations in the peak voltage and peak current with time allowable by the converter main circuit 3.

Upon powering on the motor drive 101, the determination circuit 6 compares the detection value (data) stored in the memory unit 8 with the set value set in the setting unit 7, before turning on the main circuit MCC 2 by controlling an MCC drive coil 10 based on a control signal from an MCC drive circuit 9. Provided that the detection value stored in the memory unit 8 is equal to or more than the set value set in the setting unit 7, as a result of comparison, it is assumed that the motor drive 101 got damaged at the time of occurrence of the previous abnormality, and therefore the main circuit MCC 2 is prohibited from being powered on again (hereinafter simply called "repowering"). Thereby, it is possible to avoid secondary damage to the converter main circuit 3 and the peripheral circuits such as the main circuit breaker 1 and the main circuit MCC 2.

Figure 4A:
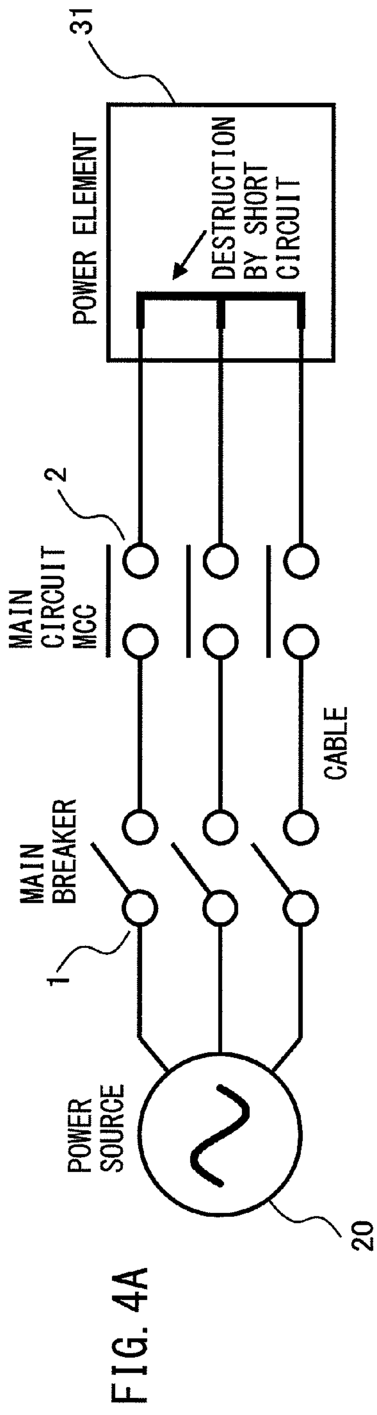
FIG. 4A is drawings for explaining a path of an electric current, when a main circuit breaker and a main circuit MCC are turned on in the state of shorting out a power element.
Figure 4B:
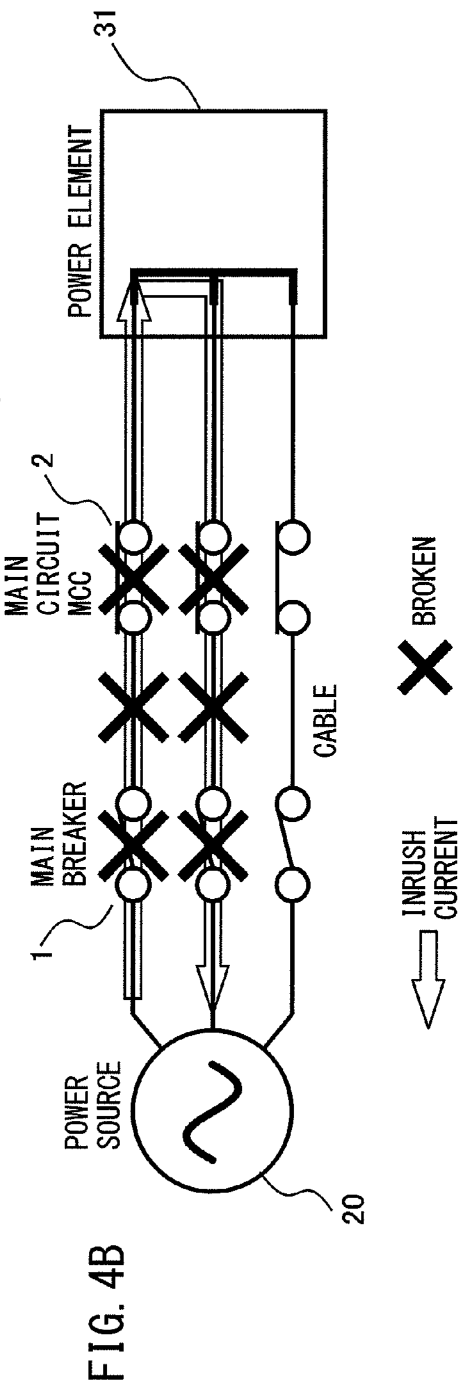
FIG. 4B is drawings for explaining a path of an electric current, when a main circuit breaker and a main circuit MCC are turned on in the state of shorting out a power element.

An impermissible peak current flowing through the power element 31 of the converter main circuit 3 may cause destruction by a short circuit, as shown in FIG. 4A. If the main circuit MCC 2 is repowered in such a state that a power element of a motor drive is shorted out, in general, as shown in FIG. 4B, the unbroken peripheral circuits such as the main circuit breaker 1 and the main circuit MCC 2, in addition to a cable and the like, are likely to be damaged by an inrush current from the power source.

As for a signal for controlling the secondary damage prevention function, a signal (external signal) inputted from the outside of the condition detection circuit 5 may be used as a trigger, as shown in FIG. 3, in addition to an alarm signal for an overcurrent, an overvoltage, a low voltage, an overload, and the like to detect the abnormality of the motor drive 101. For example, a signal from a general-purpose power interruption detector or the like may be used as a trigger.

In addition to the power element 31 typified by the switching element in the motor drive 101, for example, the main circuit breaker 1, the main circuit MCC 2, and the DC link capacitor 4 provided outside the motor drive 101 may be protected from the secondary damage.

As equipment provided outside the motor drive 101, there may be a circuit breaker, instead of the main circuit breaker 1 and the main circuit MCC 2.

There are a plurality of patterns of settings for the threshold values for the allowable peak voltage or current and the allowable number of occurrences of abnormalities, depending on a combination of the two. By way of example, the allowable number of occurrences of abnormalities may be set at 1, in a case where the allowable peak current is 200

[A]. The allowable number of occurrences of abnormalities may be set at 3, in a case where the allowable peak current is 150 [A]. The allowable number of occurrences of abnormalities may be set at 5, in a case where the allowable peak current is 100 [A].

Moreover, each threshold value may be set in consideration of reliability test data and the like, as well as the absolute maximum ratings and operation guaranteed values of the devices to be protected.

As described above, in the motor drive according to the embodiment of the present invention, the two types of threshold values are set, as to each of the peak voltage and the peak current. The first threshold value (first threshold voltage $V_{TH1}$ and first threshold current $I_{TH}$), which is the reference to detect an abnormality in the motor drive, is lower than the second threshold value (second threshold voltage $V_{TH2}$ and second threshold current $I_{TH2}$), which is the reference to determine whether or not to allow the repowering ($V_{TH1}<V_{TH2}$ and $I_{TH1}<I_{TH2}$). For example, if a detection value (V or I) that is more than the first threshold value ($V>V_{TH1}$ or $I>I_{TH1}$) to detect an abnormality is more than the second threshold value ($V>V_{TH2}$ or $I>I_{TH2}$) too, an extent of damage is determined to be severe and thus the repowering of the motor drive is unallowable. On the other hand, in a case where a peak current at the time of detecting an abnormality is less than the second threshold value though more than the first threshold value ($V_{TH2}>V>V_{TH1}$ or $I_{TH2}>I>I_{TH1}$), an extent of damage is determined to be light and thus the repowering of the motor drive is allowable.

Figure 5:
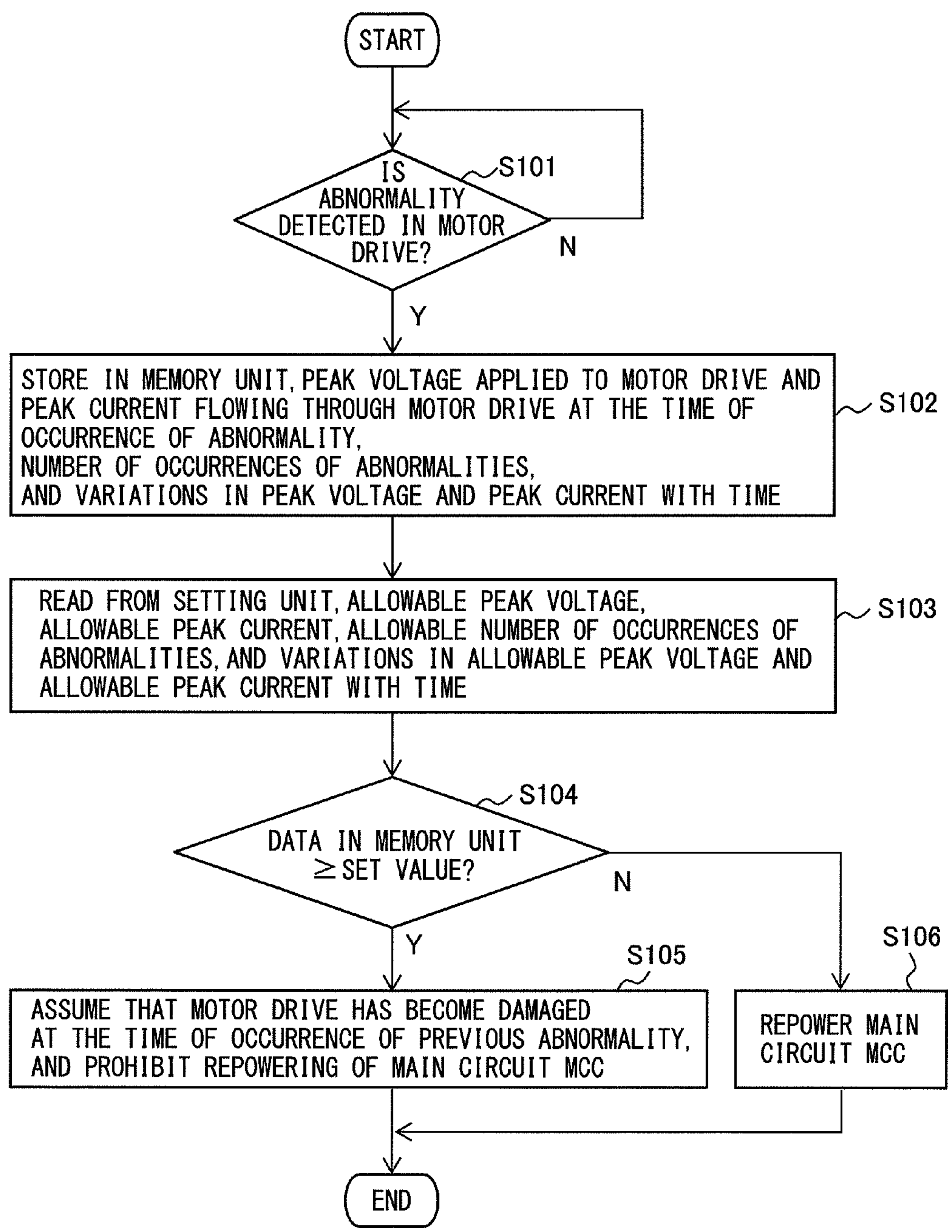
FIG. 5 is a flowchart of an operation process of the motor drive according to the embodiment of the present invention.

Next, the operation process of the motor drive according to the embodiment of the present invention will be described with reference to a flowchart shown in FIG. 5. First, the motor drive 101 (see FIG. 3) is operated to determine whether or not an abnormality is detected in the motor drive 101 in step S101. To determine the presence or absence of an abnormality, as described above, the condition detection circuit 5 detects a voltage applied from the power source 20 to the converter main circuit 3 and a current flowing from the power source 20 into the converter main circuit 3, and sends the detected data to the determination circuit 6. Then, the determination circuit 6 determines whether or not the voltage applied from the power source 20 to the converter main circuit 3 is more than the predetermined threshold voltage (first threshold voltage $V_{TH1}$), or whether or not the current flowing from the power source 20 into the converter main circuit 3 is more than the predetermined threshold current (first threshold current $I_{TH1}$) based on the data of the voltage, the current, and the like detected by the condition detection circuit 5, in order to determine whether or not the motor drive 101 is in an abnormal condition.

When no abnormality is detected, the operation goes back to step S101, and the detection of an abnormality is continued. On the other hand, when an abnormality is detected, data including a peak voltage applied to the converter main circuit 3 at the time of occurrence of the abnormality, a peak current having flowed through the converter main circuit 3 at the time of occurrence of the abnormality, the number of occurrences of the abnormality, and variations in the peak voltage and peak current with time is stored in the memory unit 8 in step S102.

Next, in step S103, the set values including the allowable peak voltage and the allowable peak current, the allowable number of occurrences of abnormalities, and the allowable variations in the peak voltage and peak current with time are read out of the setting unit 7.

Then, in step S104, it is determined whether or not the data stored in the memory unit 8 is equal to or more than the set value. Specifically speaking, it is determined whether or not the peak voltage applied to the converter main circuit 3 or the peak current having flowed through the converter main circuit 3 at the time of occurrence of the abnormality, which is stored in the memory unit 8, is equal to or more than the allowable peak voltage or the allowable peak current, respectively. Instead, it is determined whether or not the cumulative number of occurrences of abnormalities, that is, the number of abnormalities that have occurred up to this time is equal to or more than the allowable number of occurrences of abnormalities. Instead, it is determined whether or not the variations with time in the peak voltage applied to the converter main circuit 3 or in the peak current having flowed through the converter main circuit 3 at the time of occurrence of the abnormality are equal to or more than the allowable variations in the peak voltage or peak current with time.

In a case where the data stored in the memory unit 8 is equal to or more than the set value, it is determined in step S105 that the motor drive 101 becomes damaged at the time of occurrence of the previous abnormality, and hence the repowering of the main circuit MCC 2 is prohibited. On the other hand, in a case where the data stored in the memory unit 8 is less than the set value, it is determined in step S106 that the motor drive 101 did not become damaged at the time of occurrence of the previous abnormality, and hence the main circuit MCC 2 is repowered.

As described above, in the motor drive according to the embodiment of the present invention, whether or not to perform the repowering after detecting an abnormality is determined based on the peak voltage and the peak current in the converter main circuit 3 at the time of detecting the abnormality, the cumulative number of occurrences of abnormalities, and the variations in the peak voltage and peak current with time. Next, this determination process will be described in detail.

Figure 6:
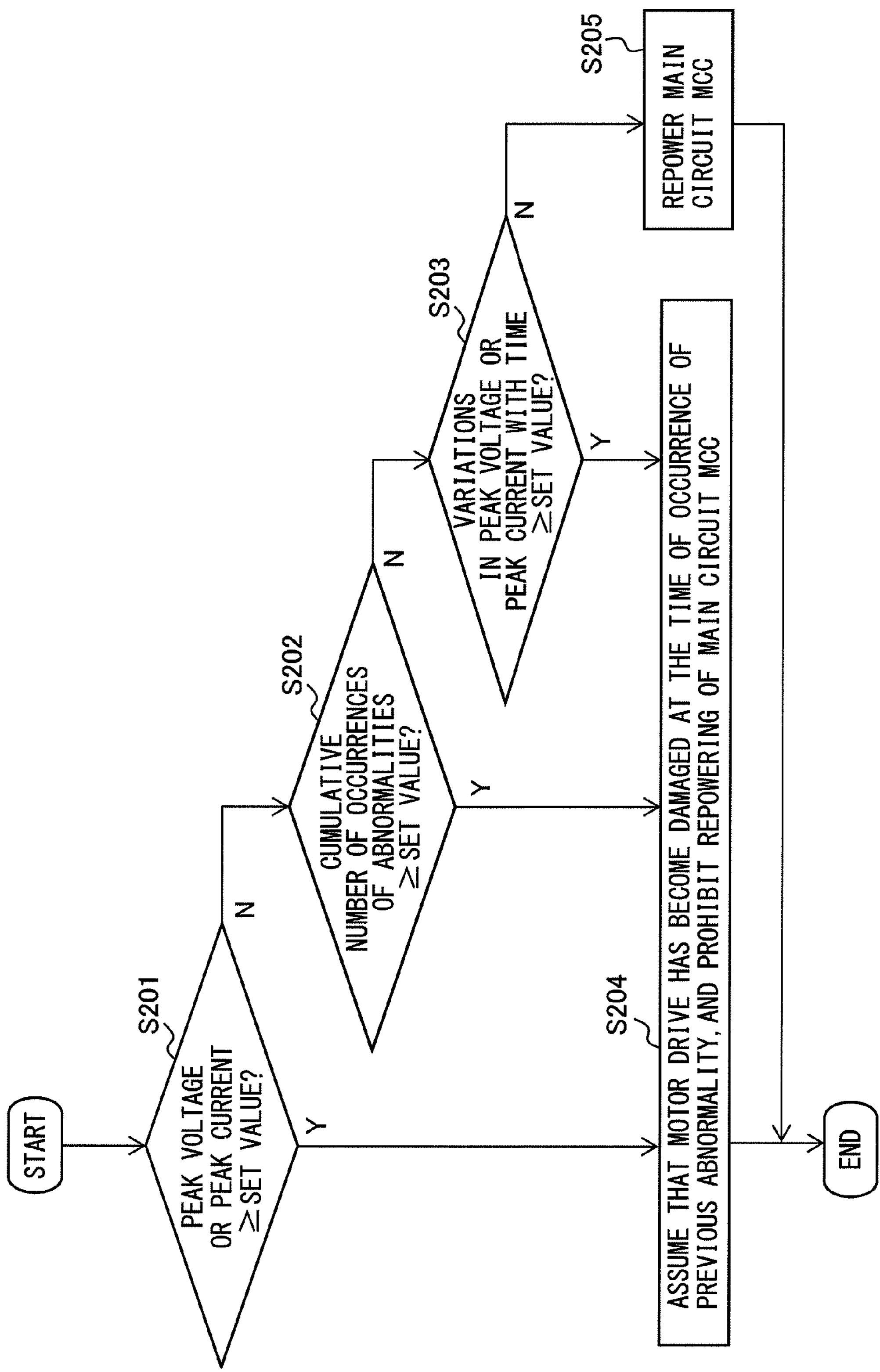
FIG. 6 is a flowchart for explaining in detail conditions for repowering the main circuit MCC in the operation process of the motor drive according to the embodiment of the present invention.

FIG. 6 is a flowchart that explains only the steps (corresponding to steps S104 to S106 in FIG. 5) for determining whether or not to perform the repowering after detecting an abnormality. First, in step S201, it is checked whether or not the peak voltage or the peak current at the time of detecting the abnormality is equal to or more than the set value. When the peak voltage or the peak current at the time of detecting the abnormality is equal to or more than the respective set value, it is determined in step S204 that the motor drive has become damaged at the time of occurrence of the previous abnormality, thus prohibiting the repowering of the main circuit MCC 2.

On the other hand, when the peak voltage or the peak current at the time of detecting the abnormality is less than the set value, it is checked in step S202 whether or not the cumulative number of occurrences of abnormalities is equal to or more than the set value. When the cumulative number of occurrences of abnormalities is equal to or more than the set value, it is determined in step S204 that the motor drive has become damaged at the time of occurrence of the previous abnormality, thus prohibiting the repowering of the main circuit MCC 2.

On the other hand, when the cumulative number of occurrences of abnormalities is less than the set value, it is checked in step S203 whether or not the variations in the peak voltage or peak current with time are equal to or more than the set value. When the variations in the peak voltage or peak current with time are equal to or more than the set value, it is determined in step S204 that the motor drive has become damaged at the time of occurrence of the previous abnormality, thus prohibiting the repowering of the main circuit MCC 2.

On the other hand, when the variations in the peak voltage or peak current with time are less than the set value, it is determined that the motor drive has not become damaged at the time of occurrence of the previous abnormality, and hence the repowering of the main circuit MCC 2 is performed.

As described above, the determination is performed based on (1) the peak voltage or the peak current in the converter main circuit 3 at the time of detecting the abnormality, (2) the cumulative time of occurrences of abnormalities, and (3) variations in the peak voltage or peak current with time, in the embodiment of the motor drive according to the present invention, but the present invention is not limited thereto. That is, the flowchart shown in FIG. 6 shows a case in which whether or not to allow the repowering is determined firstly based on (1), secondly based on (2), and finally based on (3), by way of example. However, the order of (1) to (3) may be changed. Moreover, the conditions of (1) to (3) are just examples, and not limited thereto. Whether or not to allow the repowering of the motor drive may be determined based on other conditions.

In the motor drive according to the embodiment of the present invention, it is possible to protect the component parts other than the power element inside the converter main circuit. The motor drive can be protected from different types of abnormalities from those in which an alarm is issued due to an overcurrent. Since the allowable number of occurrences of each type of alarm can be defined, the motor drive has the advantageous effect of preventing an alarm malfunction.

What is claimed is:

1. A motor drive comprising:

a condition detection circuit configured to monitor the condition of a motor drive by detecting data representing the condition of a power supply;

a determination circuit configured to determine whether or not the detected data indicates an abnormality in the motor drive using a first threshold value as a reference;

a memory unit configured to store, in an event of occurrence of the abnormality in the motor drive, a detection value including at least more than one of the following: a peak value of voltage applied to the motor drive from the power supply, a peak value of current flowing through the motor drive, a cumulative number of occurrences of abnormalities, detected data of variations per unit time in the detected peak voltage and the peak current; and a setting unit configured to set in advance allowable values as a second threshold value of the motor drive in the peak voltage, the peak current, the cumulative number of occurrences of abnormalities, the detected data of variations per unit time in the peak voltage, and the peak current, wherein, whenever the motor drive is powered on, it is determined whether or not the detection data stored in the memory unit at the last time of powering on the motor drive reaches the set values set in advance, and in a case where the detection data reaches the allowable value, powering the motor drive is prohibited to avoid secondary damage to the motor drive, and wherein the first threshold value is lower than the second threshold value, the first threshold value is a reference value for detecting abnormality of the motor drive and the second threshold value is a reference value for determining whether repowering of the motor drive is allowed or not.

2. The motor drive according to claim 1, wherein the allowable values are rewritable from a general-purpose power interruption detector provided outside of the motor drive.

* * * * *